Aug. 18, 1931. G. R. METCALF, JR 1,819,652
CONNECTER
Filed July 16, 1928

George R. Metcalf Jr.
INVENTOR.

BY
ATTORNEYS.

Patented Aug. 18, 1931

1,819,652

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONNECTER

Application filed July 16, 1928. Serial No. 293,172.

This invention is designed to improve connecters adapted to unite two members, the invention being exemplified in the specific embodiment herein illustrated as a coupling for threadless conduits. The invention provides a very simple and very effective structure for this purpose. Features and details of the invention will appear from the specification and claims.

A preferred embodiment of the invention is illustrated in the accompanying drawings as follows:—

Figure 1:
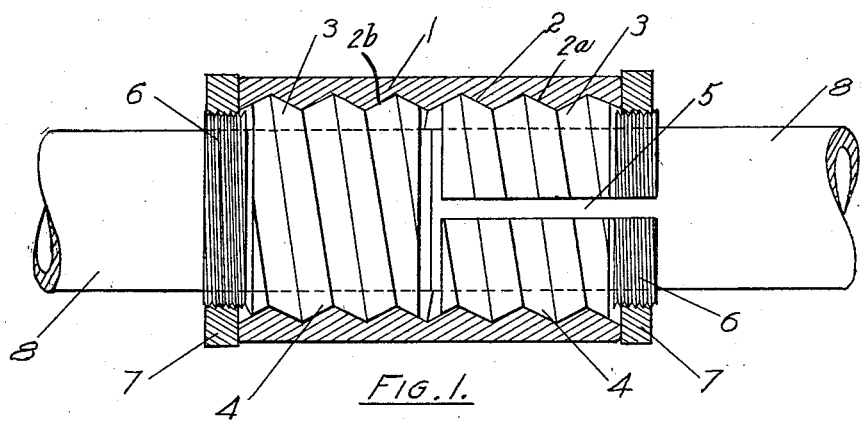

Fig. 1 shows a central sectional view of the coupling.

Figure 2:
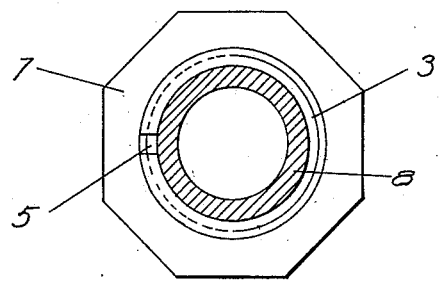

Fig. 2 an end view of the same.

Figures 3, 4:
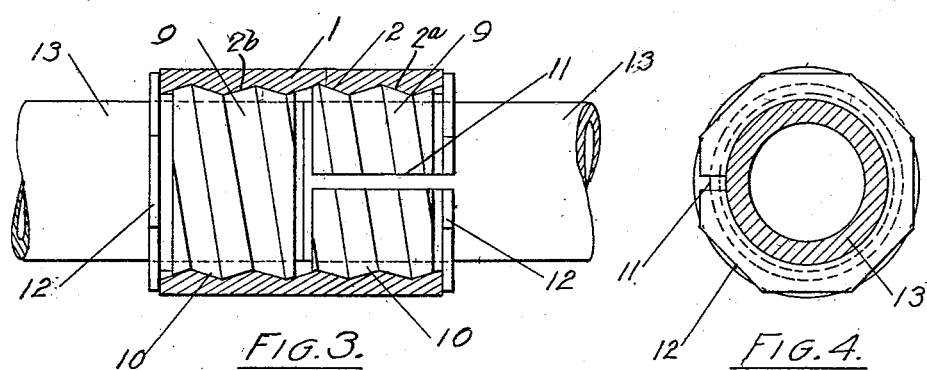

Fig. 3 a central sectional view of an alternative construction.

Fig. 4 an end view of the same.

1 marks the body of the coupling which is in the form of a sleeve and this is provided with screw threads 2 extending inwardly from each end, these screw threads merging at the center and preferably extending continuously through the sleeve 1. The slope of these threads is inclined to form wedging surfaces on both slopes 2a and 2b and the inclination of these surfaces is less relatively to the axis than to a perpendicular to the axis, in other words, the inclination is such that the frictional engagement of the slopes does not prevent its wedging action. Sleeves 3 are provided with threads 4 having slopes corresponding to the slopes of the threads 2. These sleeves have slots 5 extending axially along them so that they are contractible. The outer ends of the sleeves are provided with ordinary threads 6 on which are placed nuts 7.

In assembling the coupling the nuts 7 are ordinarily partially screwed on to the threads 6. The sleeve is screwed into the coupling, thus bringing the wedging surfaces into interlocking relation. A conduit 8 is inserted and the nut 7 tightened. As the nut is tightened the movement of the wedging surfaces forces the sleeve radially into clamping engagement with the conduit.

By making the threads with similar slopes it is possible to extend a similar thread entirely through the coupling sleeve.

In Fig. 3 the sleeve 1 has threads 2 similar to the threads 2 in Fig. 1. Sleeves 9 are provided with threads 10 of similar contour to the threads 2. The sleeves are slotted at 11 rendering these sleeves contractible. A shoulder and wrench-hold 12 may be provided at the outer end. These sleeves are screwed into the sleeve 1 and the action of the threads 9 and 2 not only accomplishes the bringing of the wedging surfaces into interlocking position but also as the sleeve is turned the engagement of the shoulder 12 arrests the further forward movement of the sleeve and a further turning of the sleeve creates a wedging action between the slopes of the threads 10 and 2 which forces the sleeve radially into clamping engagement with an inserted conduit.

In both structures the engaging wedging surfaces face outwardly so that if the conduit is subjected to longitudinal strain this added strain tends to clamp the sleeves into closer engagement with the conduit.

What I claim as new is:—

1. In a connecter, the combination of a sleeve having a thread extending inwardly from the end thereof, both slopes of the thread being inclined to form wedging surfaces, the inclination being less relatively to the axis than to a perpendicular to the axis; and a slotted sleeve having threads in wedging engagement with the first-mentioned threads.

2. In a connecter, the combination of a sleeve having a thread extending inwardly from the end thereof, both slopes of the thread being inclined to form wedging surfaces, the inclination being less relatively to the axis than to a perpendicular to the axis; a slotted sleeve having threads in wedging engagement with the first-mentioned threads; and means forcing said sleeves axially relatively to each other.

3. In a connecter, the combination of a sleeve having a thread extending inwardly from the end thereof, both slopes of the thread being inclined to form wedging surfaces, the inclination being less relatively to the axis than to a perpendicular to the axis; a slotted sleeve having threads in wedging engagement with the first-mentioned threads; and means forcing said sleeves axially relatively to each other comprising a nut on one of said sleeves, said nut acting against the other of said sleeves.

4. In a connecter, the combination of a sleeve having a thread extending inwardly from the end thereof, both slopes of the thread being inclined to form wedging surfaces; a slotted sleeve having threads in wedging engagement with the first-mentioned threads; and means forcing said sleeves axially relatively to each other and forcing the engaging slopes axially relatively to each other and contracting the slotted sleeve through the wedging action of the slopes so moved.

5. In a connecter, the combination of a sleeve having a thread extending inwardly from the end thereof, both slopes of the thread being inclined to form wedging surfaces; a slotted sleeve having threads in wedging engagement with the first-mentioned threads; and means forcing said sleeves axially relatively to each other, comprising a nut on one of said sleeves, said nut acting against the other of said sleeves.

6. In a connecter, the combination of a sleeve having a thread extending from end to end of the sleeve, both slopes of the thread being inclined to form wedging surfaces, the inclination being less relatively to the axis than to a perpendicular to the axis; and a slotted sleeve having threads in wedging engagement with the first-mentioned threads.

7. In a connecter, the combination of a sleeve having a thread extending from end to end, both slopes of the thread being inclined to form wedging surfaces, the inclination being less relatively to the axis than to a perpendicular to the axis; and a slotted sleeve at each end of the first-mentioned sleeve, each slotted sleeve having threads in wedging engagement with the first-mentioned threads.

8. In a connecter, the combination of a sleeve having a thread extending from end to end, both slopes of the thread being inclined to form wedging surfaces, the inclination being less relatively to the axis than to a perpendicular to the axis; a slotted sleeve at each end of the first-mentioned sleeve, each slotted sleeve having threads in wedging engagement with the first-mentioned threads; and means forcing the sloted sleeves axially relatively to the first-mentioned sleeve.

9. In a connecter, the combination of a sleeve having a thread extending from end to end, both slopes of the thread being inclined to form wedging surfaces, the inclination being less relatively to the axis than to a perpendicular to the axis; a slotted sleeve at each end of the first-mentioned sleeve, each slotted sleeve having threads in wedging engagement with the first-mentioned threads; and means forcing the slotted sleeves axially relatively to the first-mentioned sleeve, said means comprising a nut on each slotted sleeve acting against the first-mentioned sleeve.

10. In a connecter, the combination of a sleeve having a thread extending inwardly from the end thereof, both slopes of the thread being inclined to form wedging surfaces, the inclination being less relatively to the axis than to a perpendicular to the axis; and a slotted sleeve having threads in wedging engagement with the first-mentioned threads, the slotted sleeve being within the first-mentioned sleeve.

11. In a connecter, the combination of a sleeve having a thread extending inwardly from the end thereof, both slopes of the thread being inclined to form wedging surfaces, the inclination being less relatively to the axis than to a perpendicular to the axis; a slotted sleeve having threads in wedging engagement with the first-mentioned threads; and means forcing said sleeves axially relatively to each other, the slotted sleeve being within the first-mentioned sleeve.

12. In a connecter, the combination of a sleeve having a thread extending inwardly from the end thereof, both slopes of the thread being inclined to form wedging surfaces, the inclination being less relatively to the axis than to a perpendicular to the axis; a slotted sleeve having threads in wedging engagement with the first-mentioned threads; and means forcing said sleeves axially relatively to each other comprising a nut on one of said sleeves, said nut acting against the other of said sleeves, the slotted sleeve being within the first-mentioned sleeve.

13. In a connecter, the combination of a sleeve having a thread extending inwardly from the end thereof, both slopes of the thread being inclined to form wedging surfaces; a slotted sleeve having threads in wedging engagement with the first-mentioned threads; and means forcing said sleeves axially relatively to each other and forcing the engaging slopes axially relatively to each other and contracting the slotted sleeve through the wedging action of the slopes so moved, the slotted sleeve being within the first-mentioned sleeve.

14. In a connecter, the combination of a sleeve having a thread extending from end to end, both slopes of the thread being inclined to form wedging surfaces, the inclination being less relatively to the axis than to a perpendicular to the axis; and a slotted sleeve at each end of the first-mentioned sleeve, each slotted sleeve having threads in wedging engagement with the first-mentioned threads, the slotted sleeve being within the first-mentioned sleeve.

15. In a connecter, the combination of a sleeve having a thread extending from end to end, both slopes of the thread being inclined to form wedging surfaces; slotted sleeves arranged at each end of the first-mentioned sleeve, said slotted sleeves having threads in wedging engagement with the first-mentioned threads; and means forcing said slotted sleeve axially relatively to the first-mentioned sleeve.

16. In a connecter, the combination of a sleeve having a thread extending from end to end, both slopes of the thread being inclined to form wedging surfaces; slotted sleeves arranged at each end of the first-mentioned sleeve, said slotted sleeves having threads in wedging engagement with the first-mentioned threads; and means forcing said slotted sleeves axially relatively to the first-mentioned sleeve, comprising nuts on said slotted sleeves.

17. In a connecter, the combination of a sleeve having a thread extending from end to end, both slopes of the thread being inclined to form wedging surfaces; slotted sleeves arranged at each end of the first-mentioned sleeve, said slotted sleeves having threads in wedging engagement with the first-mentioned threads; and means forcing said slotted sleeves axially relatively to the first-mentioned sleeve and forcing the engaging slopes axially relatively to each other and contracting the slotted sleeves through the wedging action of the slopes so moved, said slotted sleeves being within the first-mentioned sleeve.

18. In a connecter, the combination of a sleeve having a thread extending inwardly from the end thereof, both slopes of the thread being inclined to form wedging surfaces; a slotted sleeve having threads in wedging engagement with the first-mentioned threads, one of said sleeves having a thread of different form than and independent of the before-mentioned threads; and a nut on the said independent thread forcing said sleeves axially relatively to each other.

19. In a connecter, the combination of a sleeve having a thread extending from end to end, both slopes of the thread being inclined to form wedging surfaces; slotted sleeves arranged at each end of the first-mentioned sleeve; and means forcing said slotted sleeves axially relatively to the first-mentioned sleeve and forcing the engaging slopes axially relatively to each other and contracting the slotted sleeve through the wedging action of the slopes so moved.

20. In a connecter, the combination of a sleeve having a thread extending from end to end, both slopes of the thread being inclined to form wedging surfaces; slotted sleeves arranged at each end of the first-mentioned sleeve; and means forcing said slotted sleeves axially relatively to the first-mentioned sleeve comprising a nut on each of the slotted sleeves.

In testimony whereof I have hereunto set my hand.

GEORGE R. METCALF, Jr.